(12) United States Patent
Miller et al.

(10) Patent No.: US 9,602,519 B2
(45) Date of Patent: Mar. 21, 2017

(54) METHODS AND SYSTEMS FOR DATA VALIDATION IN A CLIENT-SERVER ENVIRONMENT

(71) Applicant: AOL Advertising Inc., New York, NY (US)

(72) Inventors: Benjamin Aaron Miller, Columbia, MD (US); Charles Joseph Holbrook, Ellicott City, MD (US)

(73) Assignee: AOL Advertising Inc., New York, NY (US)

( * ) Notice: Subject to any disclaimer, the term of this patent is extended or adjusted under 35 U.S.C. 154(b) by 0 days.

(21) Appl. No.: 14/935,032

(22) Filed: Nov. 6, 2015

(65) Prior Publication Data
US 2016/0065591 A1    Mar. 3, 2016

Related U.S. Application Data

(63) Continuation of application No. 12/917,463, filed on Nov. 1, 2010, now Pat. No. 9,210,030.

(51) Int. Cl.
| | |
|---|---|
| G06F 15/16 | (2006.01) |
| H04L 29/06 | (2006.01) |
| H04L 29/08 | (2006.01) |
| G06Q 10/10 | (2012.01) |
| G06Q 30/02 | (2012.01) |
| G06Q 30/06 | (2012.01) |

(52) U.S. Cl.
CPC ......... H04L 63/123 (2013.01); G06Q 10/10 (2013.01); G06Q 30/0241 (2013.01); G06Q 30/0601 (2013.01); H04L 29/08072 (2013.01); H04L 67/42 (2013.01); *H04L 29/06* (2013.01)

(58) Field of Classification Search
USPC ............... 709/203, 223, 224, 205, 201, 202
See application file for complete search history.

(56) References Cited

U.S. PATENT DOCUMENTS

| | | |
|---|---|---|
| 6,629,098 B2 | 9/2003 | Mc George, Jr. |
| 6,859,910 B2 | 2/2005 | Croy |
| 6,915,454 B1 | 7/2005 | Moore et al. |
| 7,318,162 B2 | 1/2008 | Rineer et al. |
| 7,325,014 B1 | 1/2008 | Kennedy |

(Continued)

OTHER PUBLICATIONS

"ClientServer Validation," CodeIgniter Wiki, http://codeigniter.com/wiki/ClientServer Validation, Apr. 25, 2008, rev. Jun. 10, 2008 (8 pages).

(Continued)

*Primary Examiner* — Lan-Dai T Truong
(74) *Attorney, Agent, or Firm* — Finnegan, Henderson, Farabow, Garrett & Dunner (57) ABSTRACT

Methods and systems are provided for dynamically generating validation rules. In certain implementations, state information related to one or more operations is stored. A request for validation rules is received from a client. The request may include one or more parameters and an identification of an operation to be performed. In response to the request, the state information is accessed for the operation to be performed. The validation rules are then dynamically generated based on the accessed state information and at least one of the parameters or the identification in the request. The validation rules can then be transmitted to the client.

17 Claims, 3 Drawing Sheets

(56) References Cited

U.S. PATENT DOCUMENTS

| | | | |
|---|---|---|---|
| 7,346,840 B1 * | 3/2008 | Ravishankar | G06F 17/3089 |
| | | | 707/E17.116 |
| 7,366,977 B2 | 4/2008 | Chokshi | |
| 2003/0004951 A1 * | 1/2003 | Chokshi | G06F 17/243 |
| 2004/0024842 A1 | 2/2004 | Witt | |
| 2005/0065953 A1 | 3/2005 | Bower et al. | |
| 2007/0143739 A1 | 6/2007 | Taber | |
| 2008/0256612 A1 | 10/2008 | Roy et al. | |
| 2010/0333167 A1 * | 12/2010 | Luo | H04L 63/20 |
| | | | 726/1 |
| 2011/0231322 A1 * | 9/2011 | Meyer | G06F 21/10 |
| | | | 705/310 |

OTHER PUBLICATIONS

"HTML_QuickForm," Developer Tutorials., PEAR Manual, Chapter 47, http://www.developertutorials.com/pear-manual/package.html.html-quickform.html, accessed Feb. 9, 2010 (5 pages).

* cited by examiner

METHODS AND SYSTEMS FOR DATA VALIDATION IN A CLIENT-SERVER ENVIRONMENT

CROSS REFERENCE TO RELATED APPLICATION(S)

This application is a continuation of U.S. patent application Ser. No. 12/917,463 filed on Nov. 1, 2010 (now allowed), the disclosure of which is expressly incorporated herein by reference to its entirety.

TECHNICAL FIELD

The present disclosure generally relates to data processing and data validation techniques. More particularly, and without limitation, the present disclosure relates to systems and methods for validation data in a client-server environment.

BACKGROUND INFORMATION

In conventional client-server environments, a client typically receives input data from a user and then transmits the input data to a server. The server then validates the input data received from the client. If the input data is invalid, the server notifies the client (and in turn the user) on why the input data is invalid. Based on this notification, the user attempts to provide valid input data or the client may restrict the user to provide only valid input data. In such conventional approaches, the client and the user do not know ahead of time which input data will be valid. Therefore, these approaches suffer from many inefficiencies including time wasted in entering invalid input data and sending notifications concerning invalid data to the client and user.

Other conventional client-server environments have attempted to address the above-noted inefficiencies by statically implementing validation rules on the server and the client. With this approach, the client can enforce validation rules on the client side, restricting the user to provide only valid input data, before transmitting the input data to the server. The server may validate input data received from the client and/or maintain and inform the client about updated validation rules. However, this approach suffers from other drawbacks. For instance, the developers of the server must expose the internal details of its services and provide voluminous documentations on exactly how the services operate so that various clients can be properly developed to be compatible with the server. In addition, this approach requires redundant implementations of the validation rules on both the server and the client. Furthermore, because the validation rules are statically implemented on the client, any change in the validation rules on the server requires corresponding updates to all the clients, which requires time-consuming administration and can often result in inconsistencies between the validation rules on the server and on the client.

These and other disadvantages of conventional data validation systems and techniques create a need for improved validation methods and systems. There is also a need for improved validation methods and systems in client-server environments where, for example, a client requests validation rules from a server on the fly, and the server dynamically generates up-to-date validation rules.

SUMMARY

Consistent with the present disclosure, embodiments are provided for dynamically generating data validation rules. In accordance with certain embodiments, improved validation methods and systems are provided that overcome one or more of the above-identified drawbacks. Moreover, embodiments are provided that validate data in a client-server environment, wherein a client requests validation rules from a server, and then the server dynamically generates validation rules that are provided and used by the client, which then can be used to validate input data from a user, for example.

Consistent with a disclose embodiment, a computer-implemented method is provided for dynamically generating validation rules. The method may comprise storing state information related to one or more operations. The method may further comprise receiving, from a client, a request for validation rules. The request may include one or more parameters and an identification of an operation to be performed. The method may further comprise accessing, in response to the request, state information for the operation to be performed, and dynamically generating, using a processor, the validation rules based on the accessed state information and at least one of the parameters or the identification included in the request. The method may further comprise transmitting the validation rules to the client, and receiving input data from the client, wherein the input data conforms to the validation rules transmitted to the client.

Consistent with another disclosed embodiment, a computer-readable storage medium is provided that includes program instructions which, when executed by a processor, perform a method for dynamically generating validation rules. The method may comprise storing state information related to one or more operations. The method may further comprise receiving, from a client, a request for validation rules. The request may include one or more parameters and an identification of an operation to be performed. The method may further include accessing, in response to the request, state information for the operation to be performed, and dynamically generating the validation rules based on the accessed state information and at least one of the parameters or the identification included in the request. The method may further comprise transmitting the validation rules to the client, and receiving input data from the client, wherein the input data conforms to the validation rules transmitted to the client.

Consistent with yet another disclosed embodiment, a system is provided for dynamically generating validation rules. The system may comprise a storage for storing state information related to one or more operations. The system may further comprise a processor for executing program instructions for receiving, from a client, a request for validation rules, the request including one or more parameters and an identification of an operation to be performed; transmitting the validation rules to the client; and receiving input data from the client, wherein the input data conforms to the validation rules transmitted to the client. The system may further comprise a constraint generator for: accessing, in response to the request, state information from the storage for the operation to be performed; and dynamically generating the validation rules based on the accessed state information and at least one of the parameters or the identification in the request.

Consistent with yet another disclosed embodiment, a validation method is provided for a client-server environment. The method may comprise receiving an identification of an operation to be performed. The method may further comprise transmitting a request for validation rules to a server. The request may include one or more parameters and the identification of the operation. The method may further comprise receiving the validation rules from the server, wherein the validation rules are dynamically generated by the server based on state information related to the operation to be performed. The method may further comprise receiving input data, and transmitting the Input data to the server, wherein the input data transmitted to the server conforms to the validation rules.

Both the foregoing general description and the following detailed description are exemplary and explanatory only and are not restrictive of the invention, as disclosed and claimed herein.

BRIEF DESCRIPTION OF THE DRAWINGS

The accompanying drawings, which are incorporated in and constitute a part of this specification, illustrate various disclosed embodiments.

DETAILED DESCRIPTION

The following detailed description refers to the accompanying drawings. Wherever possible, the same reference numbers are used in the drawings and the following description to refer to the same or similar parts. While several exemplary embodiments are described herein, modifications, adaptations and other implementations are possible. For example, substitutions, additions or modifications may be made to the components illustrated in the drawings, and the exemplary methods described herein may be modified by substituting, reordering, removing, or adding steps to the disclosed methods. Accordingly, the following detailed description is not limiting of the disclosed embodiments. Instead, the proper scope is defined by the appended claims.

Figure 1:
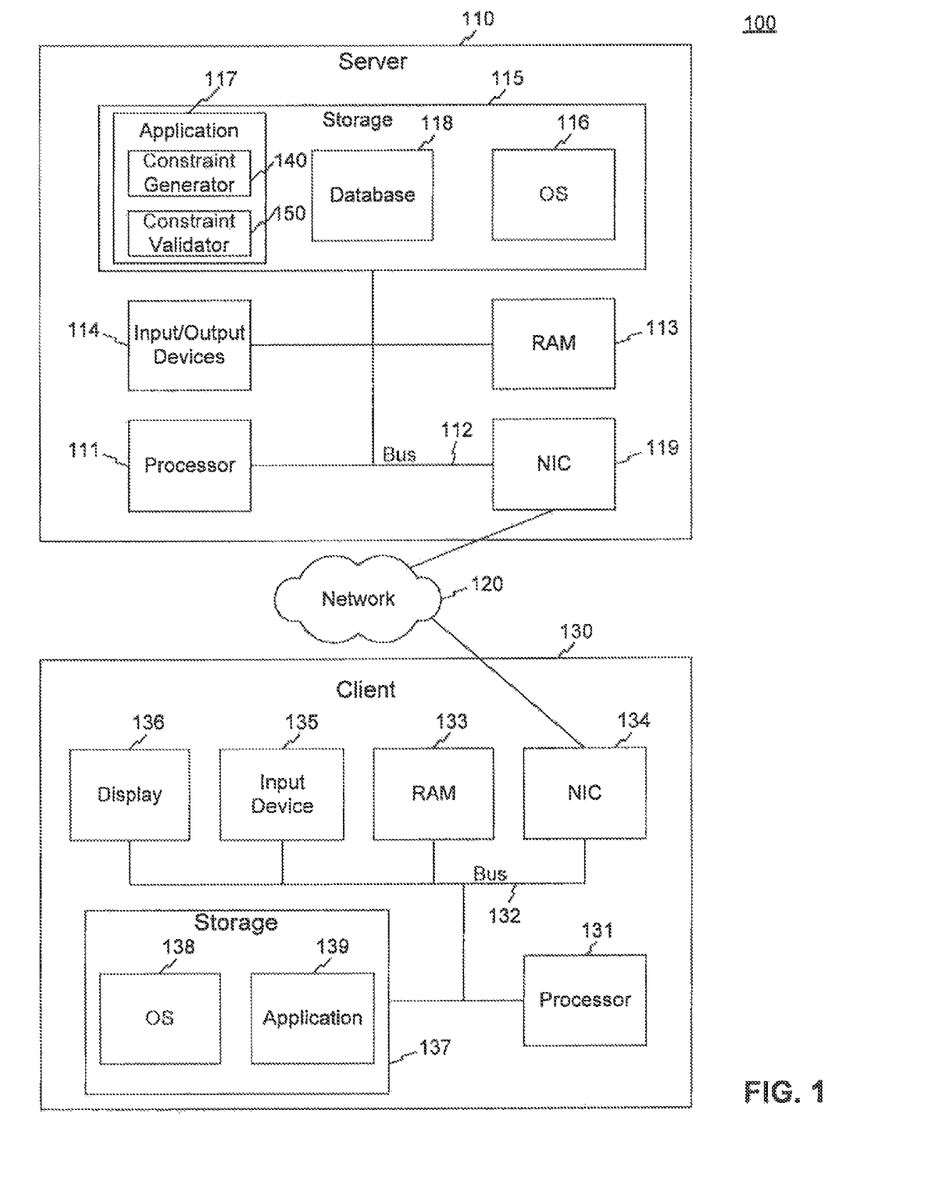
FIG. 1 illustrates an exemplary system environment for validating input data, consistent with a disclosed embodiment.

FIG. 1 illustrates an exemplary system environment 100 for validating input data. System 100 may include a server 110 and a client 130 connected by a network 120. Although FIG. 1 illustrates only one server, one client, and one network, the system may include multiple servers, clients, and/or networks.

Server 110 may include any computer system, for example, a computer, a server, a personal computer (PC), a desktop, a laptop, and a notebook. In certain embodiments, server 110 comprises a server system with a plurality of computers or a server farm that comprises a plurality of servers and a load balancer (not show). Referring again to FIG. 1, server 110 may include a processor 111, for example, a central processing unit (CPU), for executing instructions to perform processing related to validating input data. Processor 111 may be connected to a data bus 112, which connects various components of server 110. Server 110 may also include a random access memory (RAM) 113, which may be used by processor 111 for the storage of active data during the execution of instructions.

Server 110 may also include one or more input and output devices 114, for example, a keyboard, a mouse, a stylus, a microphone, a monitor, a projector, a printer, and/or a speaker. Server 110 may also include a storage 115, for example, a hard disk drive, a removable storage device, a floppy drive, a CD-ROM, a DVD-ROM, and/or a USB drive. Storage 115 may store an operating system (OS) 116. Storage 115 may also store one or more applications 117. Storage 115 may also include a database 118 for storing data related to validating input data. Server 110 may also include a network interface card (NIC) 119 for interfacing with network 120, for example, to communicate with client 130. Consistent with one embodiment, server 110 may be a web server that implements a website and is connected to the Internet.

Server 110 may implement one or more operations, and server 110 may store (e.g., in database 118) state information related to the one or more operations. For example, state information may include the current state of user-specific data, the current state of system-specific data, and the current state of operation-specific data. Examples of operations include, for instance, registering an account, updating a user profile, selling and purchasing a product or service, searching a database, making a payment, viewing media, making a reservation, searching for data, corresponding with people, applying for employment, downloading an application, e-commerce, e-banking, developing software, submitting and viewing job performance report, etc. In one embodiment, database 118 may store the state information including, for example, account information for a plurality of users who request one or more of the operations to be performed. The state information related to the operations need not be stored in database 118, but may be stored on other storage locations in server 110 or at remote storage locations accessible by server 110.

Applications 117 may include, among other things, a constraint generator 140 and a constraint validator 150. Constraint generator 140, when executed by processor 111, may access state information to generate one or more constraints, which constitute validation rules. This process will be explained in detail below.

Network 120 may include any combination of wired and/or wireless networks for supporting the communication of data between server 110 and client 130. For example, network 120 may include an Intranet, an extranet, a local area network (LAN), a wide area network (WAN), a cellular network, or the Internet, either alone or in combination with one another and/or any wired or wireless network that enables communication between server 110 and client 130.

Client 130 may include any computer system, for example, a computer, a server, a personal computer (PC), a desktop, a laptop, a notebook, a handheld device, a cellular phone, a smart phone, a personal digital assistant (PDA), and/or a portable media player. Client 130 may include a processor 131, for example, a central processing unit (CPU), for executing instructions to perform processing related to validating input data. Processor 131 may be connected to a data bus 132, which connects various components of client 130. Client 130 may also include a random access memory (RAM) 133, which may be used by processor 131 for the storage of active data during the execution of instructions. Server 110 may also include a network interface card (NIC) 134 for interfacing with network 120, for example, to communicate with server 110.

As shown in FIG. 1, client 130 may also include one or more input devices 135. By way of example, input devices 135 may include a keyboard, a mouse, a stylus, and/or a microphone for receiving input data from a user. Client 130 may also include a display 136, for example, a monitor, a screen, a touch screen, and/or a projector for displaying a graphical user interface to the user. Server 130 may also include a storage 137, for example, a hard disk drive, a removable storage device, a floppy drive, a CD-ROM, a DVD-ROM, a USB flash drive, and/or a flash memory card. Storage 137 may store an operating system (OS) 138. Storage 137 may also store one or more applications 139 and instructions related to processing validation rules and validating input data that may be executed by processor 131.

Figure 2:
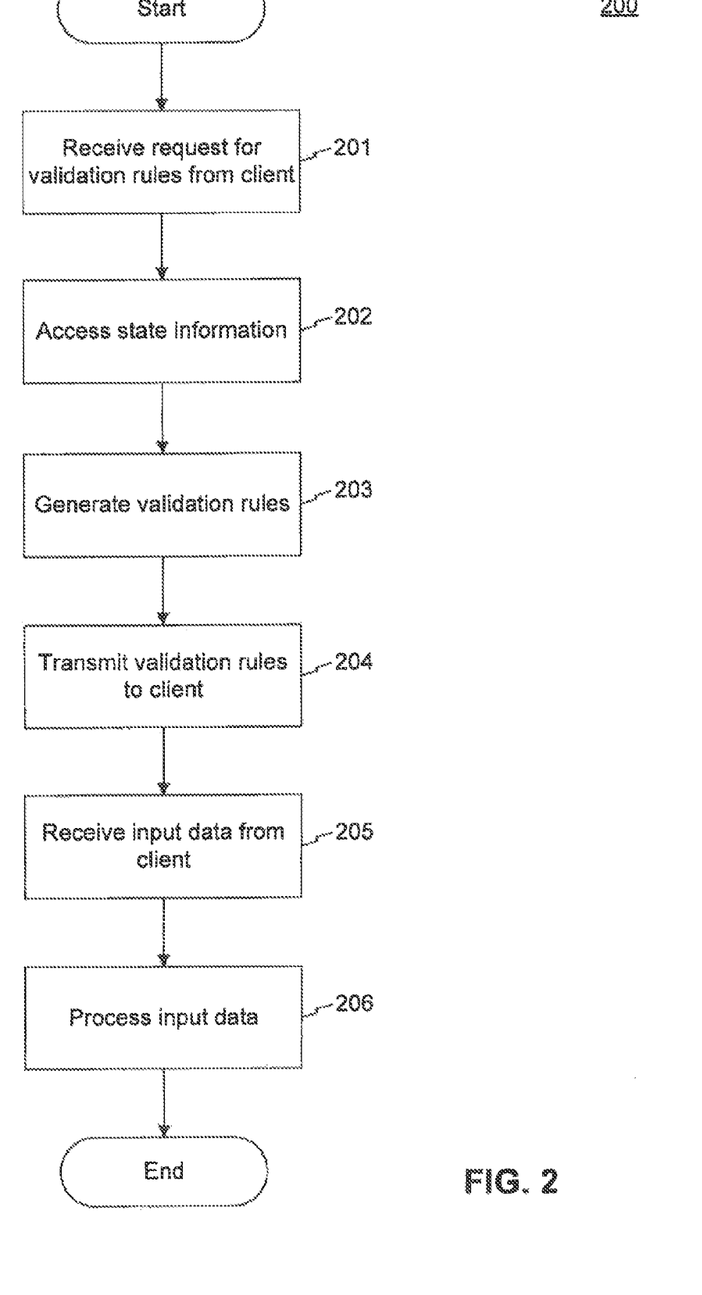
FIG. 2 illustrates an exemplary method for validating input data on a server, consistent with a disclosed embodiment.

FIG. 2 illustrates a flow chart of an exemplary method 200 for validating input data, consistent with a disclosed embodiment. With respect to the exemplary embodiment of FIG. 1, method 200 may be executed by server 110 and its various components.

In step 201, server 110 may receive a request from client 130 for the validation rules. Server 110 may receive the request via network 120 using NIC 119. In one embodiment, the request may include one or more parameters specifying which validation rules are being requested. For example, server 110 may be a web server hosted by a merchant, and client 130 may be a personal computer of a customer of the merchant. When the customer uses client 130 to browse the merchant's website, server 110 may receive from client 130 a request for validation rules. The request may include the identification of the customer and an identification of an operation that the customer wishes to perform. In this example, the customer wishes to submit a purchase order to the merchant via the merchant's website.

In step 202, server 110 may access state information in response to the request for validation rules. In one embodiment, server 110 may access and check the current state of user-specific data, system-specific data, or operation-specific data based on the parameters included in the request for validation rules. For example, if the request for validation rules includes the identification of the customer and the identification of the operation to be performed, server 110 may access and check the current state of the customer's account status, any permission settings or restrictions associated with the customer's account, and the current state of, for example, a computer system, a network system, or a shipping plant related to the operation.

In step 203, validation rules may be dynamically generated by server 110 based on the current state information that was accessed in response to the request for validation rules. Validation rules may comprise one or more constraints. In one embodiment, validation rules may be dynamically generated based on, for example, the current state of server 110, which may include one or more of the state of database 118, business rules, and security rules. The state of database 118 may include, for example, values stored in database 118. Consistent with one embodiment, a business entity, such as a corporation, may define one or more business rules based on its business practices and may also define one or more security rules. By way of example, a business rule may define which days of the week the business entity processes purchase orders, and a security rule may specify data access permissions of an employee of the business entity. All such business rules and security rules may be specified in the state information. In one embodiment, each operation may be associated with one or more validation rules. In addition, the identification of the user may be associated with one or more validation rules.

Continuing the above example of the merchant and the customer, database 118 may include account information for the customer. For example, the customer may have sufficient credit with the merchant to purchase up to $10,000 in the next 90 days. This information may be stored as user-specific state information in database 118 in association with an account for the customer. When server 110 receives the request for validation rules from client 130, constraint generator 140 may access the account information associated with the customer in database 118 to generate one or more constraints associated with the specified operation that the customer is about to perform. In this example, constraint generator 140 may generate several constraints indicating that the customer has a budget of $10,000 and may place an order only within the next 90 days.

The disclosed embodiments are not limited to the above examples. Server 110 may generate validation rules based on any data including state information stored anywhere. For example, based on the identification of the operation to be performed, server 110 may access state information related to the operation from database 118, from files stored elsewhere on server 110, and/or from a remote storage accessible by server 110. Furthermore, state information related to the operations need not be user-specific. As an illustrative example, server 110 may have a scheduled down-time for 3 hours once a week for maintenance and thus cannot process any orders in that time. Server down time would be system-specific state information that is universal to all users, and server 110 may generate appropriate validation rules based on such state information. Server 110 is capable of generating validation rules based on any constraint that is stored in Interpretable format.

The validation rules may be encoded in any generic, machine, or human-readable form, such as extensible markup language (XML) or JavaScript object notation (JSON). The validation rules may have hierarchical relationships between the rules. An exemplary set of validation rules encoded an XML file is provided below:

```
<constraints>
    <constraint scope="advertising.campaign:123456789:startDate" type=
    "less-than">Jan 1, 2000 12:00AM</constraint>
    <constraint scope="advertising.campaign:123456789:endDate" type=
    "greater-than">Mar 31, 2000 11:59PM</constraint>
    <constraint scope="advertising.campaign:123456789:budget" type=
    "equal-to">10000.00</constraint>
</constraints>
```

In this exemplary XML code representing a plurality of constraints, "advertising.campaign" is an object type, "123456789" Is a unique identifier for the object type, "startDate," "endDate," and "budget" are fields, "less-than," "greater-than," and "equal-to" are constraint types, and "Jan 1, 2000 12:00AM," "Mar 31, 2000 11:59PM," and "10000.00" are values. These constraints may constitute validation rules that limit a purchase order to be an amount no greater than the budget of $10,000 and further limit the purchase order to be between Jan. 1, 2000, and Mar. 31, 2000, for all users, or, alternatively, these constraints may be specific to the particular user identified in the request. These validations rules may be implemented on client 130 such that the user is restricted to placing a purchase order that satisfies these rules.

In step 204, server 110 may transmit the validation rules to client 130 via network 120. In one embodiment, server 110 may transmit the validation rules to client 130 via the hypertext transfer protocol (HTTP). In step 205, server 110 may receive input data from client 130. Consistent with one embodiment, the received input data may be validated by constraint validator 150 based on the same set of information used by constraint generator 140 to generate the validation rules. This validation step provides a final validation check in case the state information has changed since constraint generator 140 generated the validation rules that were sent to client 130. If the validation check fails, then new validation rules are generated by server 110 and sent to client 130 along with an error message. For example, one corporation customer may have a budget of $10,000. If two individual users within the corporation both login to server 110, each user may receive validation rules indicating that each has a budget of $10,000. Because this scenario may result in the two users placing purchase orders that exceed the budget for the corporation customer, the validation may be performed to provide an approval process for the purchase order to properly address the situation in which the constraints may change between the time constraint generator 140 generated the validation rules and the time constraint validator 150 validates the input data.

In step 206, server 110 may process the input data received from client 130. Processing the input data may include performing any transaction based on the input data, including the identified operation. Continuing the above example of the merchant and the customer, server 110 may process the purchase order made by the customer.

Although a detailed example of an operation has been provided with respect to a purchase order, the disclosed embodiments are not limited to this example. It will be appreciated from the present disclosure that embodiments may be implemented for a wide variety of different operations. Examples of operations include, for instance, registering an account, updating a user profile, selling and purchasing a product or service, searching a database, making a payment, viewing media, making a reservation, searching for data, corresponding with people, applying for employment, downloading an application, e-commerce, e-banking, developing software, submitting and viewing job performance report, etc.

Consistent with the present disclosure, any operation that server 110 may perform may have state information related to the operation, which can be used to dynamically generate one or more validation rules. For example, validation rules may include constraints on the purchase amount and shipping date for the operation of making an online purchase, constraints on the length and the types of characters included in the username and password for the operation of registering a user account, constraints on the type of financial accounts that can be used for the operation of making an online payment, constraints on the length of a resume and the number of resumes that may be submitted for the operation of applying for employment, constraints on the length of viewing time within a specified time period for the operation of viewing media online, etc.

Figure 3:
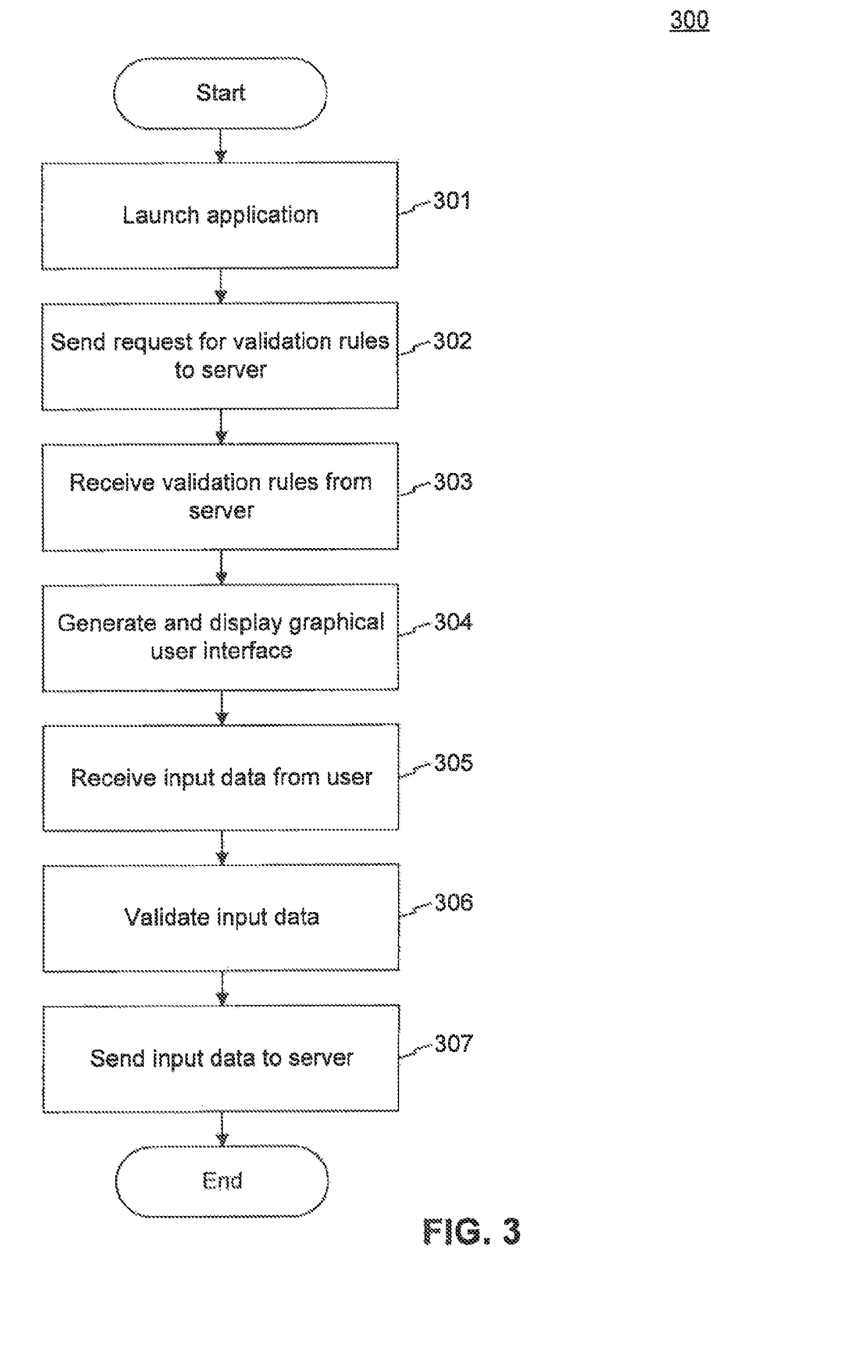
FIG. 3 illustrates an exemplary method for validating input data on a client, consistent with a disclosed embodiment.

FIG. 3 illustrates a flow chart of another exemplary method 300 for validating input data, consistent with a disclosed embodiment. With respect to the exemplary embodiment of FIG. 1, method 300 may be executed by client 130 and its various components.

In step 301, a user may launch an application 139 on client 130. For example, the user may control client 130 via input device 135 to start an Internet browser on client 130, and direct the Internet browser to server 110. Alternatively, the user may start an application program installed on client 130 that was designed as a client program for server 110.

Continuing the above example of the merchant and the customer, the customer may operate client 130 to launch browser application and direct the browser to the website of the merchant hosted by server 110.

In step 302, in response to the user starting application 139 on client 130, client 130 may request the validation rules from server 110. In one embodiment, client 130 may send a request for validation rules to server 110 via network 120. In one embodiment, the request may be transmitted via hypertext transfer protocol (HTTP). The request for validation rules may include one or more parameters including, for example, an identification of the user and an identification of an operation that the user wishes to perform. In the above example, the request may include the name of the user account associated with the customer and an indication that the customer wishes to make a purchase order. Other parameters may include, for example, information identifying a location, information regarding client 130, information regarding operating system 138 or application 139, etc. So long as server 110 has been implemented to receive certain types of parameters and use such parameters along with state information related to certain types of operations to dynamically generate validation rules, any type of parameter and any type of operation may be implemented by the disclosed embodiments.

In step 303, client 130 may receive the validation rules from server 110 via network 120. Consistent with one embodiment, client 130 may store the validation rules in, for example, RAM 133 or storage 137. Client 130 may include a constraint interpreter (not shown) for parsing the validation rules received from server 110. In one embodiment, the constraint interpreter is a generic interpreter capable of Interpreting a wide range of constraints. In the above example, client 130 may receive an XML file from server 110 that includes several constraints that define the total budget for the customer and the dates within which the customer may place an order. Client 130 may receive one or more validation rules from server 110. Alternatively, client 130 may receive an indication from server 110 that no validation rules exist for the request. In one embodiment, the XML file including the validation rules may be received via hypertext transfer protocol (HTTP).

In step 304, client 130 may generate, based on the validation rules, a graphical user interface for receiving input data. Client 130 may then display the graphical user interface on display 136 to the user. In the above example, client 130 may display a browser application with a web-based form for the customer to place a purchase order.

In one embodiment, the validation rules may specify one or more constraints on input data that may be entered on client 130. For example, a validation rule may restrict a username entered by a user on client 130 to be only alphanumeric characters. As another example, in the context of an online auction website, a validation rule may require a bid entered by a user to be higher than the previous bid by a specified dollar amount. In general, a validation rule may include any type of rule, limitation, constraint, or restriction on Input data that may be entered. In addition, a validation rule may include requirements regarding operations that a user may perform or information that a user may access. A wide variety of operations may be available to the user based on features provided by server 110 and client 130, including, for example, registering an account, updating user profile, purchasing a product or service, searching a database, making a payment, viewing media, making a reservation, etc. In one embodiment, client 130 may display information regarding the validation rules to the user. For example, client 130 may include in the graphical user interface an explanation of the constraints corresponding to the validation rules in a human-readable language.

Continuing the above example of the merchant and the customer, the web-based form may restrict the customer to place a purchase order wherein the total purchase amount is no more than $10,000 and the date of the order must be within the next 90 days. In addition, the graphical user interface may display that the customer can make an order of no more than $10,000 and that the order must be dated within the next 90 days. The exemplary budget and date restrictions are examples that are specific to a particular user. If another user uses client 130, then client 130 may request validation rules from server 110 for this particular user and may receive different validations rules based on the information stored in database 118 for this user. For example, another user may have a larger budget of $100,000 and no date restrictions, but is required to user a particular shipping method.

Consistent with an embodiment, the graphical user interface generated by client 130 based on the validation rules may be coded in a markup language such as hypertext markup language (HTML). Further, the graphical user interface may be displayed on a browser application capable of rendering HTML or other markup language files. Additionally, or alternatively, the graphical user interface may be part of an interface of a software program, such as a web application or Java program. Also, the graphical user interface may include one or more graphical components, such as, a text box, a button, a list box, a drop down list, a check box, a radio button, and/or a menu. Other types of graphical components may be included in the graphical user interface.

In one embodiment, each graphical component may include one or more parameters that define the characteristics of the graphical component. These parameters may be consistent with or enforce a validation rule. For example, a text box may include a parameter that sets the maximum number of characters that may be typed into the text box. As another example, a list box may include a parameter that sets the maximum number of items that may be listed in the list box. Some parameters of graphical components may include default values. The parameters of graphical components may be set by client 130 based on the validation rules such that the user must provide input data that conforms to the validation rules. Therefore, validation rules may be enforced through the graphical user interface.

In step 305, the user may input data to client 130 using input device 135 and the graphical user interface displayed on display 136, and client 130 may receive the input data from the user. Continuing the above example of the merchant and the customer, the customer may place a purchase order totaling $7,000 for 20 days from today.

In step 306, client 130 may validate the input data based on the validation rules. If a violation of the validation rules is detected, client 130 may notify the user and prompt the user to re-enter input data. Continuing the above example of the merchant and the customer, if the customer places a purchase order in which the total amount exceeds the $10,000 budget or the order is place for 120 days from today, then client 130 would detect a violation of the validation rules and prompt the customer to change the purchase order to conform to the validation rules.

In step 307, client 130 may send the Input data to server 110 via network 120. Continuing the above example of the merchant and the customer, if the customer returns to the website, client 130 will again request validation rules from server 110, and server 110 will again check the current state information (which may have changed since the previous generation of validation rules) and dynamically generate updated validation rules to be sent to client 130. Therefore, the new validation rules should reflect updated state information. In the case of this example, the updated user-specific state information limits the customer's budget to only $3,000, because the customer has previously made a $7,000 purchase, and server 110 will use the updated state information to dynamically generate the new validation rules.

In one embodiment, the validation rules are not statically implemented or stored in client 130. Rather, whenever the user is about to perform an operation, client 130 requests server 110 to generate up-to-date validation rules based on state information reflecting current state data on the fly. Upon receiving this request, server 110 dynamically generates validation rules based on the current state information, and transmits the validation rules to client 130. This ensures that client 130 receives the most up-to-date set of validation rules, and also eliminates the need to maintain or update duplicate copies of validation rules on client 130.

As one of ordinary skill in the art will appreciate, one or more of steps 201-206 and 301-307 may be optional and may be omitted from implementations in certain embodiments. Furthermore, functionalities provided by one or more of steps 201-206 and 301-307 may be subdivided into multiple steps.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. For example, while certain examples of validation rules have been provided herein, the scope of the invention is not limited to such examples. Embodiments consistent with the invention may implement a wide array of validation rules, using various constraints such as, constraints related to mailing, shipping, and billing addresses, email addresses, authorization or clearance level, security level, authorized services, viewable products, roles, tasks, organizations, etc. Furthermore, one or more types of validation rules may be associated with each operation type. For example, if the operation to be performed by the user (which would be indicated in the request for validation rules) is making a purchase order, the associated validation rules may include those related to amount, date, shipping, items, etc.

Furthermore, while the described implementations include software, systems and methods consistent with the disclosed embodiments may be implemented as any combination of hardware and software or in hardware alone. Examples of hardware include computing or processing systems, including personal computers, servers, laptops, mainframes, micro-processors and the like. Additionally, although aspects of the disclosed embodiments are described as being stored in memory, one skilled in the art will appreciate that these aspects can also be stored on other types of computer-readable media, such as secondary storage devices, for example, hard disks, floppy disks, or CD-ROM, or other forms of RAM or ROM, USB media, DVD, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets. One or more of such software sections or modules can be integrated into a computer system or existing e-mail or browser software.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the blocks of the disclosed routines may be modified in any manner, including by reordering blocks and/or inserting or deleting blocks. It is intended, therefore, that the specification and examples be considered as exemplary only, with a true scope and spirit being indicated by the following claims and their full scope of equivalents.

What is claimed is:

1. A computer-implemented method for dynamically generating validation rules, the method comprising the following operations performed by at least one processor:
   transmitting, to a server, a request for validation rules, the request for validation rules including an identification and a location of a user;
   receiving, from the server, the validation rules, the validation rules being dynamically generated by the server, in response to the request, based on account information and the location associated with the user;
   receiving, from the user, input data, the input data conforming to the received validation rules; and
   transmitting, to the server, the input data.

2. The method of claim 1, wherein the request for validation rules includes an identification of an operation to be performed.

3. The method of claim 2, wherein the validation rules generated by the server are based on the operation to be performed.

4. The method of claim 1, further comprising:
   validating the input data based on the validation rules.

5. The method of claim 1, wherein the validation rules include one constraint on the input data received from the user.

6. The method of claim 5, further comprising:
   notifying the user if the input data violates at least one of the validation rules.

7. The method of claim 1, further comprising:
   generating, based at least in part on the validation rules, a graphic user interface for receiving input data from the user; and
   presenting, to the user, the graphic user interface.

8. A system for dynamically generating validation rules comprising:
   a memory device that stores instructions; and
   one or more processors that execute the instructions to:
      receive, from a client, a request for validation rules, the request including an identification and a location of a user;
      access account information associated with the user;
      dynamically generate validation rules, in response to the request, based on the accessed account information and the location associated with the user;
      transmit, to the client, the validation rules; and
      receive, from the client, input data, the input data conforming to the validation rules.

9. The system of claim 8, wherein the request for validation rules includes an identification of an operation to be performed.

10. The system of claim 9, wherein the validation rules generated by the one or more processors are based on the operation to be performed.

11. The system of claim 8, wherein the validation rules include at least one constraint on the input data received from the client.

12. A system for validating input data entered by a user comprising:
   a memory device that stores instructions; and
   one or more processors that execute the instructions to:
      generate a request for validation rules, the request including an identification and a location of a user;
      transmit, to a server, the request for validation rules;
      receive, from the server, the validation rules, the validation rules being dynamically generated by the server, in response to the request, based on account information and the location associated with the user;
      receive, from the user, input data;
      validate the input data received from the user based on the validation rules; and
      transmit, to the server, the validated input data, the validated input data conforming to the received validation rules.

13. The system of claim 12, wherein the request for validation rules includes an identification of an operation to be performed.

14. The system of claim 13, wherein the validation rules dynamically generated by the server are based on the operation to be performed.

15. The system of claim 12, wherein the one or more processors notify the user if the input data violates at least one of the validation rules.

16. The system of claim 12, further comprising a display device, wherein
   the one or more processors generate, based at least in part on the validation rules, a graphic user interface for receiving input data from the user; and
   the display device presents to the user the graphic user interface.

17. A non-transitory computer readable medium executing a computer program, the computer program comprising instructions causing a computing device to:
   transmit, to a server, a request for validation rules, the request including an identification and a location of a user;
   receive, from the server, the validation rules, the validation rules being dynamically generated by the server, in response to the request, based on account information and the location associated with the user;
   receive, from the user, input data, the input data conforming to the received validation rules; and
   transmit, to the server, the input data.

* * * * *